United States Patent [19]
Cossette et al.

[11] Patent Number: 5,251,081
[45] Date of Patent: Oct. 5, 1993

[54] SPINDLE GROUNDING DEVICE

[75] Inventors: Luke A. Cossette; Christopher G. Keller, both of Rochester; Brian E. Schultz, Lakeville, all of Minn.

[73] Assignee: International Business Machines Corporation, Armonk, N.Y.

[21] Appl. No.: 1,942

[22] Filed: Jan. 8, 1993

Related U.S. Application Data

[63] Continuation of Ser. No. 708,544, May 31, 1991, abandoned.

[51] Int. Cl.$^5$ .................. G11B 33/14; G11B 17/02
[52] U.S. Cl. .................. 360/97.02; 360/99.08
[58] Field of Search ............ 360/99.08, 99.04, 97.02, 360/97.03

[56] References Cited

U.S. PATENT DOCUMENTS

| | | | |
|---|---|---|---|
| 3,226,666 | 12/1965 | Lord | 310/232 |
| 3,234,495 | 2/1966 | Martinez | 339/5 R |
| 4,037,125 | 7/1977 | Aoki | 310/248 |
| 4,216,512 | 8/1980 | Vidwans | 360/133 |
| 4,368,398 | 1/1983 | Mabuchi | 310/248 |
| 4,378,138 | 3/1983 | Sohre | 339/5 R |
| 4,623,952 | 11/1986 | Pexton | 361/220 |
| 4,701,653 | 10/1987 | Merkle et al. | 310/152 |
| 4,831,295 | 5/1989 | Posedel | 310/72 |
| 4,985,792 | 1/1991 | Moir | 360/99.08 |
| 4,987,514 | 1/1991 | Gailbreath et al. | 361/220 |

OTHER PUBLICATIONS

IBM Technical Disclosure Bulletin, vol. 28, No. 4, Sep. 1985, "Motor Antistatic Brush and Spindle Seal for a Hard Disk File" by Brue et al.

Primary Examiner—A. J. Heinz
Attorney, Agent, or Firm—Richard E. Billion; Bradley A. Forrest

[57] ABSTRACT

Disclosed is a disk drive having an enclosure for housing one or more disks, an actuator arm and sliders attached to the actuator arm. The sliders include magnetic transducers for reading information related to data off the disk and for writing representations of data to the disk. In a disk drive with an in-hub, fixed spindle shaft motor, the disk or disks are attached to the hub which is rotatably mounted to the spindle shaft. The hub includes one or more fingers attached to the hub which touch the spindle shaft when the hub is stationary and when the hub is rotating. The spindle shaft may also be provided with a wear resistant layer and/or ring of conductive material to enhance the electrical pathway between the hub and the spindle shaft and provide for lower wear and a longer life.

20 Claims, 6 Drawing Sheets

SPINDLE GROUNDING DEVICE

This is a continuation of application Ser. No. 07/708,544, filed May 31, 1991, and now abandoned.

FIELD OF THE INVENTION

The present invention pertains to the field of disk drives which are also called direct access storage devices (DASD).

More particularly, this invention pertains to an apparatus and method for providing an electrically conductive path between rotating members in a disk drive.

BACKGROUND OF THE INVENTION

One of the key components of a computer system is a place to store data. Typically, computer systems employ a number of storage means for archiving information and data. One place a computer can store data is in a disk drive, which is also called a direct access storage device.

A disk drive or direct access storage device includes one or more disks which look similar to 45 rpm records used on a record player, or compact disks which are used in a CD player. The disks are stacked on a spindle, much like several 45 rpm records waiting to be played. In a disk drive, however, the adjoining disks are mounted to the spindle and spaced apart so that the separate disks do not touch each other. Currently, available disks are about 2½" and 3½" in diameter. Disk drives having smaller diameter disks are also currently being worked on by many in the industry.

The surface of each disk is smooth and uniform in appearance. Data on the disks in a disk drive is not stored in grooves. Each of the surfaces is, however, divided into portions where data is stored. Each disk surface has a number of data tracks situated in concentric circles like rings on a tree. The tracks on the disk essentially replace the grooves in a 45 rpm record. Each track in a disk drive is further subdivided into a number of sectors which is just one portion of the circumferential track.

Disks in a disk drive are made of a variety of materials. The substrate or inner core can be made of glass, plastic or metal. In the case of magnetic recording, a magnetizable layer of metal is placed on the substrate or inner core. Data is stored on such a disk by magnetizing a portion of the magnetizable layer of the disk. The portion magnetized will be one or more of the sectors mentioned above. The data is usually transformed or encoded into a more compact form before it is recorded on the disk.

In order to magnetize the surface of a disk, a small ceramic block containing an electromagnetic transducer known as a read/write head is passed over the surface of the disk at specific tracks and sectors. More specifically, the read/write head is flown at a height of approximately six millionths of an inch or less from the surface of the disk as the read/write head is energized to various states causing a domain within a sector in the track below to be magnetized.

To retrieve data stored on a magnetic disk, the read/write head is flown over the disk. The small magnetized portions of the disk induce a current in the read/write head. By looking at current from the read/write head and decoding the pattern, the data can be reconstructed and then used by the computer system.

Like a record, both sides of a disk are generally used to store data or other information necessary for the operation of the disk drive. Since the disks are held in a stack and are spaced apart from one another, both the top and the bottom surface of each disk in the stack of disks has its own read/write head.

The ceramic block and the magnetic transducer it holds are moved over the surface of a disk using an actuator arm that compares to the tone arm in a stereo record player. The actuator arm, holds all the transducers or read/write heads, one head for each surface of each disk, in a structure that looks like a comb. The structure is also commonly called an E block.

Problems can occur in a disk drive when the electrical charge on the disk or disks differs from the electrical charge on the read/write heads. In a disk drive, the magnetic disks rotate as the read/write heads are passed over the disks. Such different amounts of electrical charge can be due to static electricity buildup due to the rotation of the disks or due to an electrostatic discharge to the disk drive. The electrical charge of the read and write elements and the electrical charge of the disks can also differ if the read and write elements are biased electrically. When using some types of read and write elements, such as those associated with a magneto-resistive head, the elements are biased or electrically charged so they work properly.

The problems that can occur when the electrical charge on the disk is different from the electrical charge on the read/write element or on the slider include the electrostatic discharge or a spark jumping across the space between the read/write elements and the disks. Such a spark may damage the magnetized portions of the disk resulting in loss of data. Likewise, the read/write elements of the heads are often destroyed during such events. Loss of data or the read/write heads for reading data or writing data is very undesirable.

Currently, many disk drives have a spindle assembly which includes a fixed shaft. The spindle assembly also includes a hub attached to the shaft so it can rotate about the shaft. The disks are attached to the hub. The hub rotates with the aid of two sets of spindle bearings and spindle races. A motor inside the spindle assembly turns the hub and the disks attached to the hub. The internal space of the spindle assembly which houses the motor is sealed from the atmosphere surrounding the disks using a seal containing a liquid which conducts electricity. Currently, the electrical path used to prevent different electrical charges on the disks as compared to the read and write elements has been the electrical path through this seal. The resistance to the flow of electrical current from the motor hub to the shaft changes drastically since the balls in the spindle bearings sometimes make contact between the hub and the shaft races. When the ball bearings do not make this contact, the fluid's resistance to the flow of electricity is very high (in the mega-ohm range) and is not low enough to always prevent an undesirable electrostatic discharge between the disks and the read/write elements of the heads. In addition, the electrical path through the seal does not prevent an unwanted electrical charge differential between the read/write elements of a sensitive magneto-resistive head and the disks.

Another apparatus used to ground a rotating spindle shaft for a disk drive without an in-hub motor is shown in U.S. Pat. No. 4,623,952 issued to Paxton. A leaf spring includes a tab that rides on the end of the rotating shaft provides an electrical path between the spindle shaft and the disk enclosure. This requires the shaft to extend to the outside of the disk enclosure. In addition, the spindle shaft must be rotating. In addition, this design adds height to the disk drive and wastes precious space, especially considering some of today's disk drives are one-half inch high.

In other art areas, slip rings have been used to provide an electrical path between a stationary member and a rotating member; however, slip rings are generally not adapted for high-speed, ultra-low wear applications such as a disk drive. In a disk drive, disks attached to a hub travel at 3,600 or greater revolutions per minute. In other art areas, such as brushes for large motors, the contact force on the shaft is not conducive to long wear or long life. The large forces used assure contact so that signals may be passed across the brush. The large forces also result in high wear, a relatively short life, and high amounts of debris from the wear.

Since the fluid seal's resistance is high and there is no low resistance ground path to prevent undesirable electrostatic events, there is a need for providing a reliable, electrical path between a disk in a disk drive and the head and the read/write elements housed therein. There is also a need for a device that is adapted for the high speeds and low wear necessary for a disk drive. Such a reliable, electrical path would prevent differences in electrical potential when comparing the electrical potential of the read and write elements to the electrical potential of the disk or disks. Furthermore, there is a need for providing an electrical path capable of having low wear and a long life and adapted to a high speed application.

SUMMARY OF THE INVENTION

Disclosed is a method and apparatus for providing a reliable, consistent, low resistance, electrical path between the shaft and the hub of a spindle assembly of a disk drive. Disclosed is a ring of conductive and highly wear-resistant material attached or applied to the fixed spindle shaft. Attached to the rotating hub is at least one finger which extends from the hub to the ring of conductive, wear-resistant material attached or applied to the fixed spindle shaft. The finger is shaped so as to produce a spring member having a small contact force on the ring. This allows for a low wear rate and long life necessary for the product. Advantageously, the finger is adapted for high-speed applications. As the hub spins at operating speeds in excess of 3,500 rpm, the centrifugal force on the finger-shaped spring lessens the contact force on the ring. The reduced contact force results in reduced wear on the finger and on the ring on the shaft.

Another advantage is that this particular physical arrangement minimizes the amount of space required. This space saving advantage is critical since the disk drive industry is constantly moving to smaller and smaller disk drives. Currently, disk drives on the market feature form factors for 3½" disks and 2½" disks. Some of the current 2½" form factor disk drives have a height of one-half inch. Currently, standards committees, with members from various disk drive manufacturers, are discussing form factors for 1¾" disks. As technology progresses, the size of disk drives will decrease further, so a space saving design is always advantageous. In addition, the finger maintains contact with the ring on the shaft which provides a reliable conductive path between the hub and the spindle shaft. The resulting conductive path has a resistance approximately six (6) orders of magnitude less than the conductive electrical path through the seal relied upon in the prior art.

BRIEF DESCRIPTION OF THE DRAWINGS

For a better understanding of the present invention, reference can be made to the accompanying drawings, in which.

These drawings are not intended as a definition of the invention but are provided solely for the purpose of illustrating the preferred embodiments of the invention described below.

DETAILED DESCRIPTION OF THE PREFERRED EMBODIMENT

Figure 1:
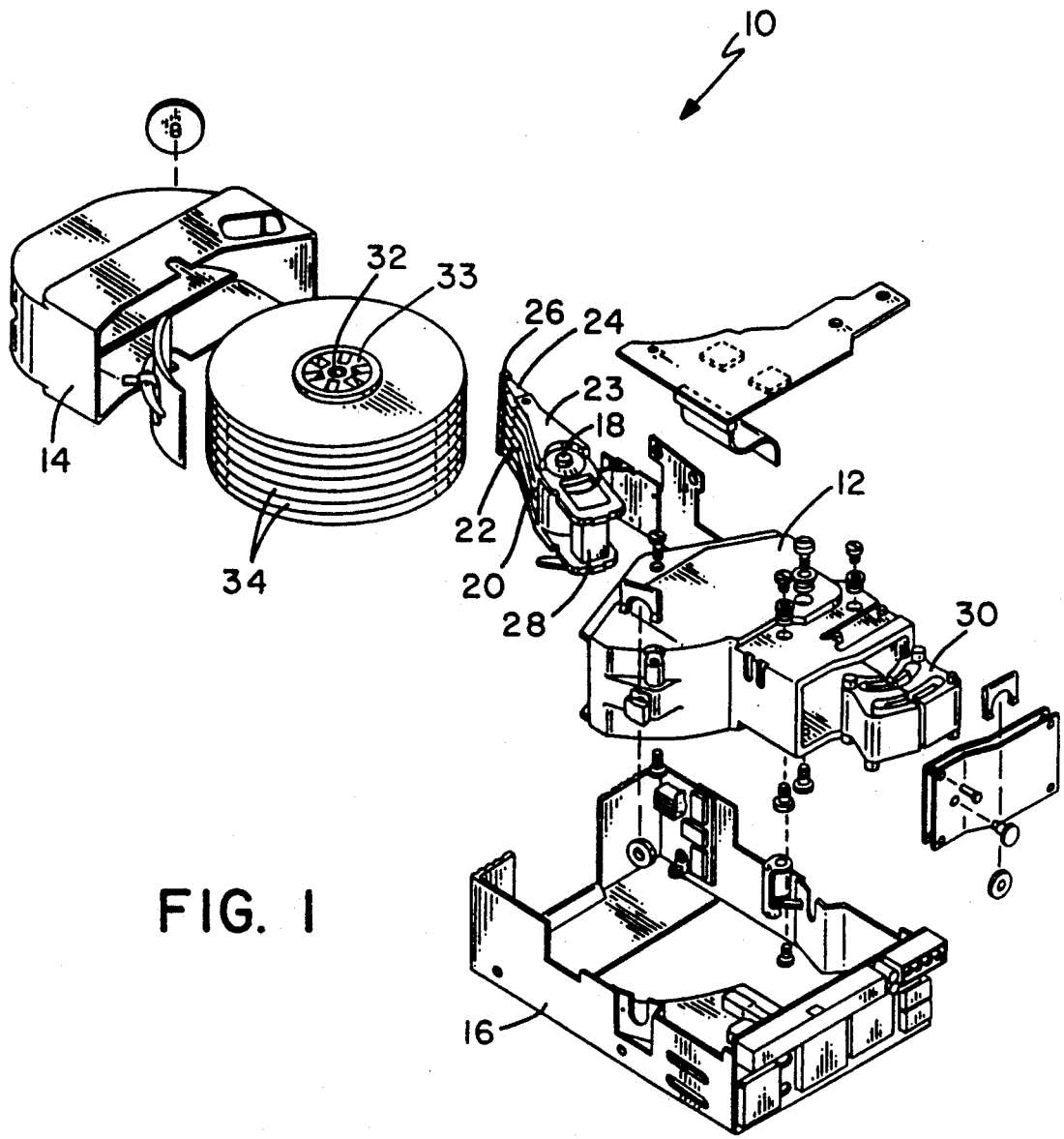
FIG. 1 is an exploded view of a disk drive.

The invention described in this application is useful with all mechanical configurations of disk drives or direct access storage devices ("DASD"). FIG. 1 is an exploded view of a disk drive 10. It should be noted that although a rotary actuator is shown, the invention described herein is also applicable to disk drives with linear actuators. The disk drive 10 includes a housing 12, and a housing cover 14 which, after assembly, is mounted within a frame 16. The housing 12 and the housing cover 14 form a disk drive enclosure. Rotatably attached within the housing 12 on an actuator shaft 18 is an actuator arm assembly 20. The actuator arm assembly 20 includes an E block or comb like structure 22 having a plurality of arms 23. Attached to the separate arms 23 on the comb or E block 22, are load springs 24. Attached at the end of each load spring is a slider 26 which carries read/write elements (not shown in FIG. 1). On the other end of the actuator arm assembly 20 opposite the load springs 24 and the sliders 26 is a voice coil 28.

Attached within the housing 12 is a pair of magnets 30. The pair of magnets 30 and the voice coil 28 are key parts of a voice coil motor which applies a force to the actuator assembly 20 to rotate it about the actuator shaft 18. Also mounted within the housing 12 is a spindle shaft 32. A hub assembly 33 is rotatably attached to the spindle shaft 32. The spindle assembly 31 includes the spindle shaft 32 and the hub assembly 33. A number of disks 34 are attached to the hub assembly 33. In FIG. 1, eight disks are attached to the hub assembly 33. As shown in FIG. 1, the disks 34 are attached to the hub assembly 33 with equal spacing between each disk.

Figure 2:
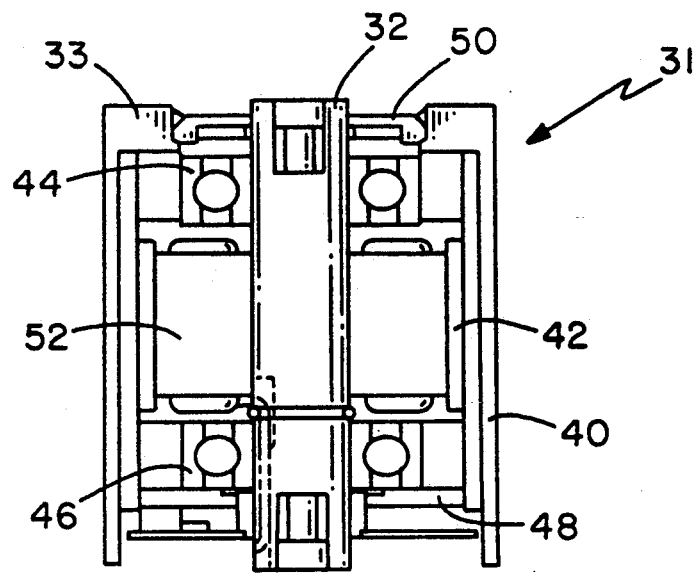
FIG. 2 is a cross sectional view of a prior art in hub motor for a disk drive.

Now turning to FIG. 2, the spindle shaft 32 and hub assembly 33 will be further detailed. The hub assembly includes a hub 40, hub magnets 42, a first bearing set 44, a second bearing set 46, a mechanical seal 48 and a magnetic fluid seal 50. Attached to the spindle shaft 32 is a stator 52 which is a set of coils through which electrical current passes. In operation, the stator 52 on the spindle shaft 32 and the hub magnets 42 attached to the inside of the hub 40 form an in-hub electrical motor which is used to rotate the hub 40 and the disks 34 which are attached to the hub. Electrical energy is input to the stator so that the polarity of the stator is constantly changing and rotating. The hub magnets 42 on the hub 40 follow the changing polarity. In a disk drive, the in-hub motor rotates in excess of 3,500 revolutions per minute.

The first bearing set 44 is attached to one end of the spindle shaft 32 and to the hub 40. The second bearing set 46 is attached to the other end of the spindle shaft 32 and the hub 40. The first and second bearing sets allow the hub 40 to spin or rotate easily as the in-hub motor rotates the hub 40. The chamber housing the in-hub motor is sealed from the atmosphere in the rest of the disk drive enclosure, formed from the housing 12 and the housing cover 14 (see FIG. 1). A mechanical seal 48 on one end of the hub assembly 33 and the magnetic fluid seal 50 on the other end of the hub assembly 33 seal the atmosphere around the in-hub motor. The electrical path or ground path in this prior art embodiment relied on the electrical path through the magnetic fluid seal 50, and upon the electrical path created when the ball bearings in one of the first or second bearing sets happened to be physically positioned to produce a good conductive pathway. In other words, at any point in time, the ball bearings may be contacting one race or the other, floating between the races or contacting both the race near the spindle shaft 32 and the race near the hub 40.

Figure 3:
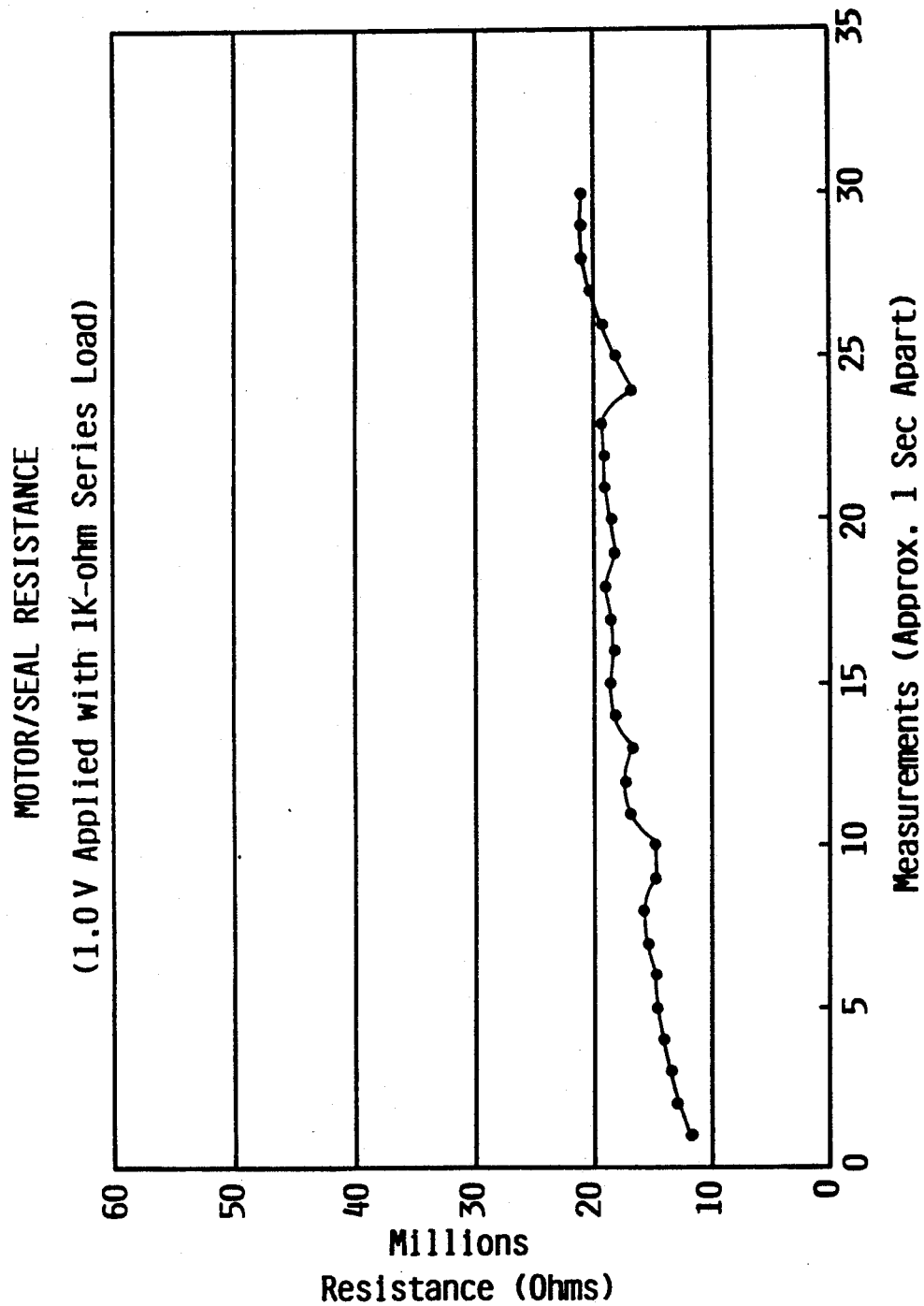
FIG. 3 is a plot showing resistance in ohms to current flow across the conductive magnetic fluid seal in a disk drive device without the invention.

FIG. 3 is a plot of the resistance to conducting electricity between the spindle 32 and the hub 40 with respect to time in the prior art device shown in FIG. 2. FIG. 3 shows that the resistance is generally high with a resistance in the range of 12 to 22 mega-ohms. This is the resistance across the magnetic fluid seal 50 that is relied on for a ground path. In addition, short duration decreases in the spindle resistance (not shown) occur, reflecting the times when the ball bearings happen to be physically positioned to produce a ground path between the spindle shaft 32 and the hub 40. In summary, the resistance between the hub and the shaft is generally high and drops on occasion when the ball bearings in one of the first bearing set 44 or the second bearing set 46 provides a physical path between the hub 40 and the spindle shaft 32.

Another problem with the prior art approach of relying on the magnetic fluid seal 50 for a conductive path between the hub 40 and the spindle shaft 32, is that the resistance of the magnetic fluid in the seal 50 increases over extended lengths of time due to the evaporation of fluid over time.

Figure 4:
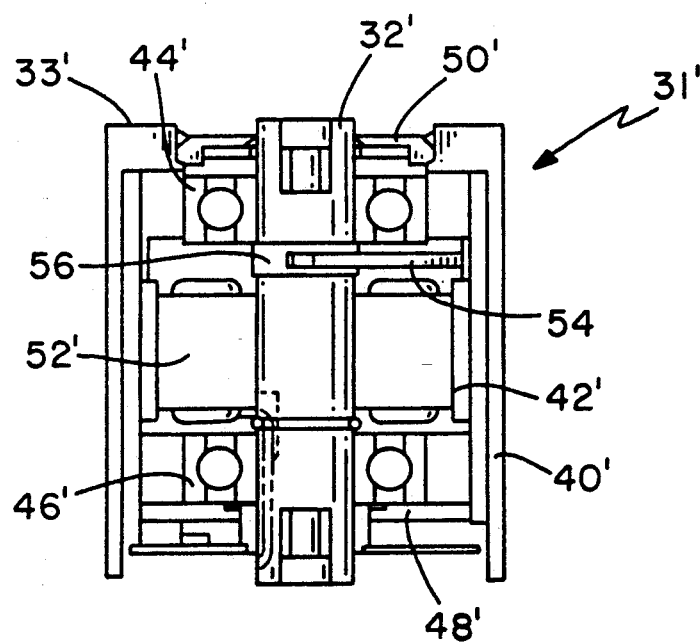
FIG. 4 is a cross sectional view of an in hub motor for a disk drive employing the disclosed invention.

The spindle shaft 32' and hub assembly 33' shown in FIG. 4 solves all of the problems attendant with the prior art. The structure of the inventive spindle shaft 32' and hub assembly 33' shares many common elements with the prior art device shown in FIG. 2. The spindle assembly 31' includes the spindle shaft 32' and the hub assembly 33'. The hub assembly 33' includes a hub 40', hub magnets 42', a first bearing set 44', a second bearing set 46', a mechanical seal 48' and a magnetic fluid seal 50'. Attached to the spindle shaft 32' is a stator 52' which is a set of coils through which electrical current passes. As with the prior art device, in operation the stator 52' on the spindle shaft 32' and the hub magnets 42' attached to the inside of the hub 40' form an in-hub electrical motor which is used to rotate the hub 40' and the disks 34' which are attached to the hub 40'.

In addition, the spindle assembly 31' includes a finger 54 attached to the hub 40'. The finger 54 is shaped so that it contacts on the spindle shaft 32' of the device. As the hub 40' rotates, the finger 54 touches the spindle shaft 32'. A layer of conductive, low wear-rate material is placed around the periphery of the spindle shaft 32' where the finger 54 touches the spindle shaft 32' as the hub spins. As shown in FIG. 4, a layer of electrically conductive plating is applied to the spindle shaft 32' about the periphery where the finger touches the shaft, which is shown as area 56. It should be noted that the conductive material around the spindle shaft is not absolutely necessary to this invention. However, the layer of conductive, low wear-rate material enhances the life of the conductive path and the life of the product.

The life of disk drive products is currently about 50,000 hours or greater than 150,000 hours MTBF (Mean Time Between Failures). The low wear-rate material enhances the life of the electrical path when considering the high revolutions per minute and corresponding high linear speeds which lead to shorter lives. Ultimately, this enhances the life of the product, as a conductive path will remain to prevent data loss due to electrostatic discharge or other undesirable electrical discharge.

Figure 5:
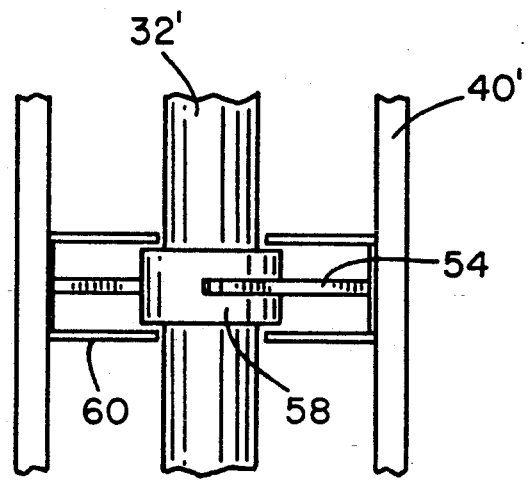
FIG. 5 shows a second embodiment of the invention partially in cross section.
Figure 6:
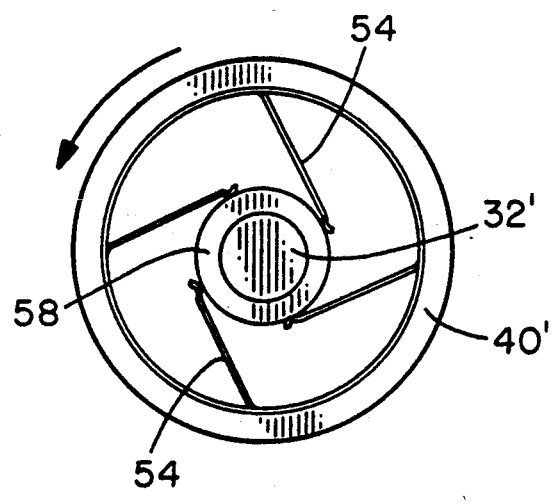
FIG. 6 shows partial cross sectional top view of the second embodiment shown in FIG. 5.

FIGS. 5-6 show a second embodiment of the invention. The second embodiment features four fingers 54 attached to the hub 40' which touch the spindle shaft 32'. The second embodiment also features a thin ring 58 of highly conductive material, such as silver plating, placed on the spindle shaft 32'. A layer of conductive material, such as DIXON 7035, could be substituted for the thin ring 58. This material has a low wear rate. In addition, a ring of conductive material could be located within a groove in the spindle shaft 32' or the spindle shaft could be cast of a suitable conductive material. The second embodiment also has a labyrinth 60 for capturing any debris or particles generated as the fingers 54 ride on the shaft 32'.

Figure 7:
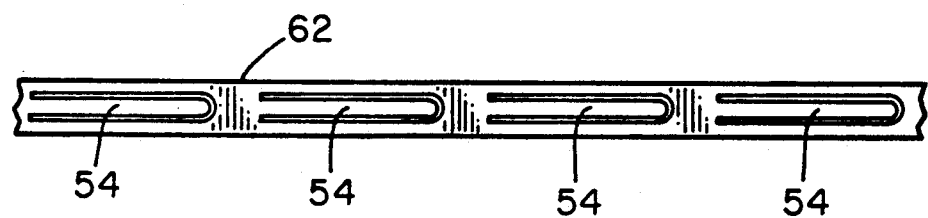
FIG. 7 shows a top view of a strip of sheet metal showing the fabrication of the fingers.

FIG. 7 shows the layout of the fingers 54 on a strip of sheet metal 62. The fingers 54 are stamped or photoetched from the strip of sheet metal 62. The fingers 54 are then bent to form the shape shown in FIG. 5 and the strip of sheet metal 62 is spot welded in place within the hub 40'. In order to form the labyrinth shown in FIG. 6, the sheet metal 62 could be widened. The fingers would still be formed in the same way and the widened portions could be folded to a position orthogonol with the strip of sheet metal 62. The sheet metal would then be attached by spot welding it to the hub 40'.

The fingers 54 may also be made from several bundles of individual conductive fibers such as described in U.S. Pat. No. 4,398,113, which is available from Litton Poly-Scientific. Forming the fingers 54 from this material has several advantages. Fingers 54 made from this material are thought to have better wear characteristics and better electrical conductivity since there are more fibers to contact the spindle shaft 32'.

Figure 8:
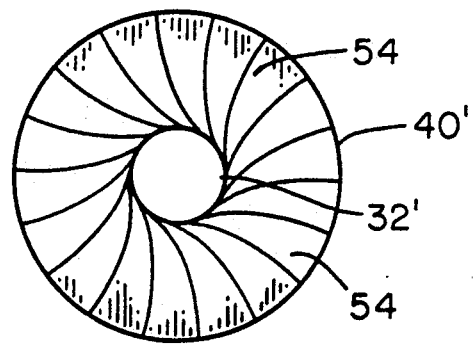
FIG. 8 shows partial cross sectional top view of a third embodiment of the invention.

FIG. 8 shows a third embodiment of the invention. In this particular embodiment the fingers are a plurality of single conductive fibers 64 or conductive fingers 54 which are attached to the hub 40' and which touch the spindle shaft 32'.

Figure 9:
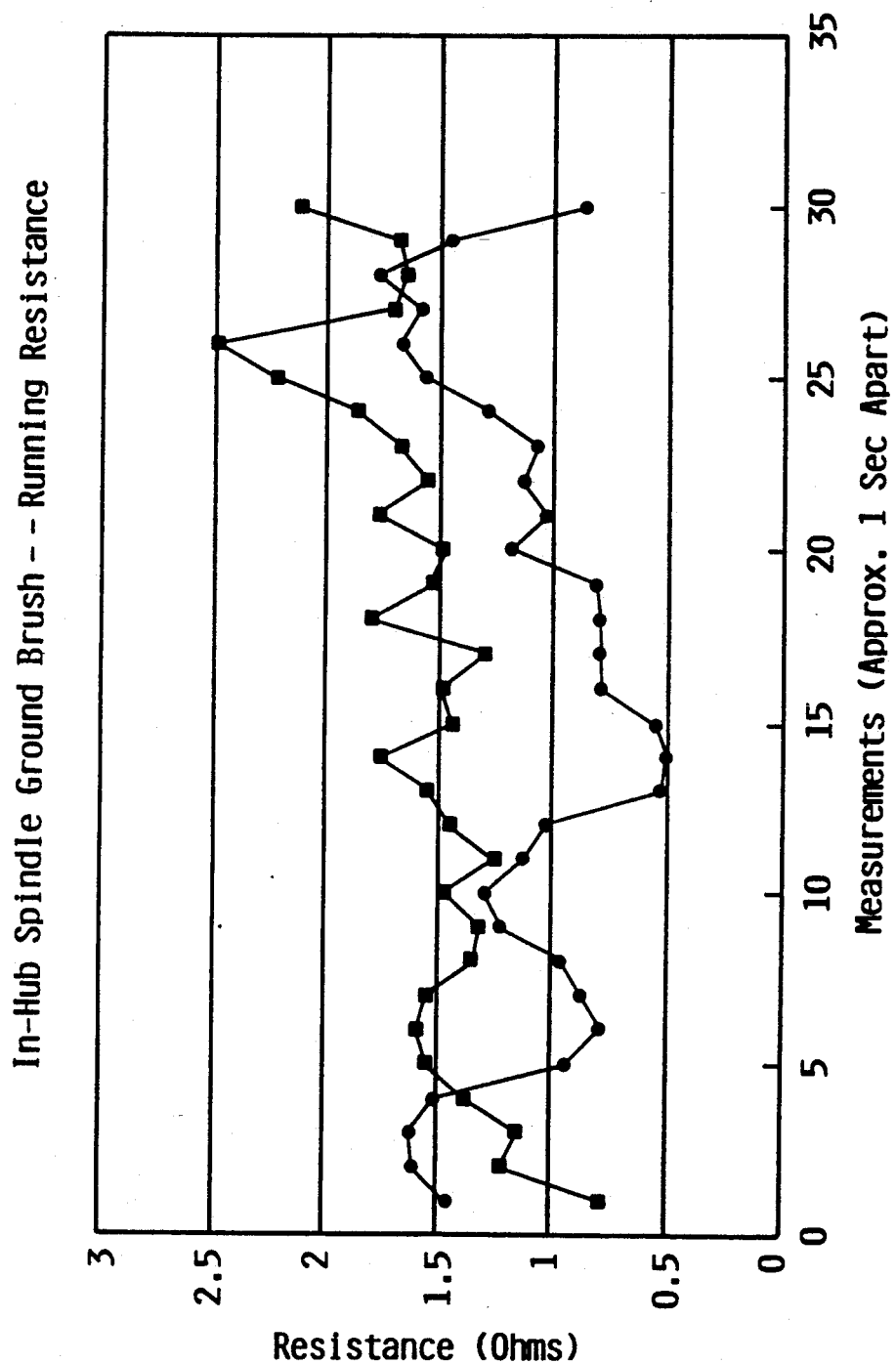
FIG. 9 is a plot showing resistance in ohms to current flow across the finger spring conductive path in a disk drive device employing the invention.

The embodiments of the invention have many advantages over the prior art. FIG. 9 is a plot of the resistance to conducting electricity between the spindle shaft 32' and the hub 40' with respect to time with the invention. FIG. 9 shows that the resistance to conducting electricity is in the range of 0.5 ohms to 2.5 ohms, which is very low. When compared to the prior art method, the resistance is in excess of six orders of magnitude lower. As a result, electrostatic charge can be drained away in a controlled fashion.

Other advantages arise from mounting the fingers onto the spinning hub 40'. First of all, the fingers show better wear characteristics by taking advantage of centrifugal forces. In operation, the fingers 54 are adjusted so that they place a contact force of about 1.0 gram or less onto the spindle shaft 32' when the hub 40' is at rest. When the hub 40' is spinning at operating speed (3,500 rpm or greater), the contact force is reduced to about 0.5 grams due to a centrifugal force acting on the fingers 54. Since wear is directly associated with the contact force of the fingers 54, the wear on the fingers and the spindle shaft is reduced due to the spinning of the hub 40'. Thus, the fingers 54 have low wear to provide for the long life of the product and further are adapted for use in high-speed applications.

An additional advantage gained from attaching the fingers 54 to the hub 40' is that the design is space saving. As the industry moves to smaller and smaller form factors, the height of the spindle becomes more and more critical. Placing the fingers onto the hub 40' saves space for the windings or stator of an in-hub motor. The fingers can be press fit into the hub. Alternatively, the hub could be relieved so that the bushing for the bearing could fit over a portion of the sheet metal 62 used to attach the fingers to the hub 40. If the fingers were attached to the spindle shaft, it would be difficult to mount the fingers. In addition, if the fingers were attached to the spindle shaft, the undesirable wear characteristic brought about by the higher linear velocities and increased wear length at the hub diameter, would make the required long device lifetimes unattainable.

It should also be noted that the second and third embodiments of the invention may have a further advantage over the first embodiment shown. It is advantageous to have several fingers 54 rather than a single finger since with multiple fingers 54 an electrical pathway with low resistance is always more likely to be available. A single finger 54 may lift off the spindle shaft 32 due to shock, vibration, or the presence of wear debris. In the multi-finger embodiments, if one of the fingers 54 leaves the surface of the spindle shaft 32', another finger will likely still be in contact with the spindle shaft 32', thereby assuring a path for electrical conductivity.

The present invention and the best modes of practicing it have been described. It is to be understood that the foregoing description is illustrative only and that other means and techniques can be employed without departing from the full scope of the invention as described in the appended claims.

What is claimed is:
1. A disk drive comprising:
   a housing;
   a spindle shaft attached to said housing;
   a hub mounted to said spindle shaft so that the hub can rotate about said spindle shaft;
   a plurality of fingers attached to said hub and contacting said spindle shaft, each of said plurality of fingers located within substantially the same plane;
   a disk mounted on said hub;
   one or more transducers; and
   actuator means for moving the transducer over the surface of the disk.

2. The disk drive of claim 1 wherein plurality of fingers is comprised of an electrically conductive material.

3. The disk drive of claim 2 wherein the electrically conductive material is metal.

4. The disk drive of claim 3 wherein plurality of fingers is formed by stamping out a piece of sheet metal and bending the stamped out portion so that it contacts the spindle shaft.

5. The disk drive of claim 1 wherein said plurality of fingers is made from a plurality of conductive fibers.

6. The disk drive of claim 1 further comprising a labyrinth attached to said hub, said labyrinth for catching wear debris from said plurality of fingers.

7. The disk drive of claim 1 wherein said plurality of fingers are attached to said hub, said plurality of fibers orientated to contact said spindle shaft.

8. The disk drive of claim 7 wherein said plurality of fingers are made of metal.

9. The disk drive of claim 7 wherein said plurality of fingers are made of bundles of electrically conductive material.

10. The disk drive of claim 7 wherein said plurality of fingers are made of single strands of conductive material.

11. The disk drive of claim 7 further comprising a labyrinth attached to said hub, said labyrinth for catching wear debris from said plurality of fingers.

12. A spindle assembly for a memory device using rotating media comprising:
   a fixed spindle shaft;
   a hub mounted for rotation about said spindle shaft; and
   a plurality of fingers each having two ends, one of said ends attached to the hub and the other of said ends contacting said spindle shaft, each of said fingers of said plurality of fingers located within substantially the same plane.

13. A disk drive comprising:
   a housing;
   a spindle shaft;
   a hub mounted to said housing;
   a plurality of fingers attached to one of said hub or said spindle shaft which rotates with respect to the other of said hub or said spindle, each of said plurality of fingers located within substantially the same place;
   a disk mounted on said hub;
   a transducer; and
   actuator means for moving the transducer over the surface of the disk.

14. The disk drive of claim 13 wherein said plurality of fingers is made from a plurality of conductive fibers.

15. The disk drive of claim 13 wherein said plurality of fingers are attached to one of said hub or said spindle shaft which rotates with respect to the other of said hub or said shaft, said fingers orientated to contact the other of said hub or said spindle shaft.

16. A disk drive comprising:
   a housing;
   a spindle shaft attached to said housing, said spindle shaft having a region having a material with higher wear resistance than the material comprising the other portions of the spindle shaft;

a hub mounted to said spindle shaft so that the hub can rotate about said spindle shaft;

one or more fingers attached to said hub and contacting said spindle shaft, said one or more fingers contacting the region of the spindle shaft having a material with higher wear resistance;

a disk mounted on said hub;

one or more transducers; and actuator means for moving the transducer over the surface of the disk.

17. The disk drive of claim 16 wherein the region on the spindle with higher wear resistance is provided by an electrically conductive paint, plating or other protective coating.

18. A disk drive comprising:

a housing;

a spindle shaft attached to said housing, said spindle shaft having a ring of conductive material having a conductivity higher than the conductivity of the material forming the spindle shaft;

a hub mounted to said spindle shaft so that the hub can rotate about said spindle shaft;

one or more fingers attached to said hub and contacting said spindle shaft, said ring of conductive material placed on the spindle shaft so that said one or more fingers contact the ring as the hub rotates in relation to the spindle shaft, a disk mounted on said hub;

one or more transducers; and actuator means for moving the transducer over the surface of the disk.

19. A spindle assembly for a memory device using rotating media comprising:

a fixed spindle shaft, including an area having lesser resistance to current flow when compared to the rest of the spindle shaft;

a hub mounted for rotation about said spindle shaft; and a finger having two ends, one of said ends attached to the hub and the other of said ends contacting said spindle shaft at said area of the spindle shaft having a lesser resistance to current flow when compared to the rest of the spindle shaft.

20. A disk drive comprising:

a housing;

a spindle shaft;

a hub mounted to said housing;

a finger attached to one of said hub or said spindle shaft which rotates with respect to the other of said hub or said spindle, the other of said spindle shaft or said hub which rotates having a region having a material with higher wear resistance, said region corresponding to the region contacted by the finger;

a disk mounted on said hub;

a transducer; and actuator means for moving the transducer over the surface of the disk.

* * * * *